(12) United States Patent
Cholkar et al.

(10) Patent No.: US 10,666,524 B2
(45) Date of Patent: May 26, 2020

(54) COLLABORATIVE MULTIMEDIA COMMUNICATION

(71) Applicant: GENBAND US LLC, Frisco, TX (US)

(72) Inventors: Arjun Cholkar, Frisco, TX (US); Anthony Jones, Ottawa (CA); Ibrahim Dogru, Istanbul (TR); Don Gilchrist, Frisco, TX (US)

(73) Assignee: GENBAND US LLC, Frisco, TX (US)

( * ) Notice: Subject to any disclaimer, the term of this patent is extended or adjusted under 35 U.S.C. 154(b) by 768 days.

(21) Appl. No.: 14/486,485

(22) Filed: Sep. 15, 2014

(65) Prior Publication Data
US 2015/0295777 A1    Oct. 15, 2015

Related U.S. Application Data

(60) Provisional application No. 61/978,705, filed on Apr. 11, 2014.

(51) Int. Cl.
*G06F 3/0484* (2013.01)
*H04L 12/24* (2006.01)
(Continued)

(52) U.S. Cl.
CPC .......... *H04L 41/22* (2013.01); *G06F 3/0486* (2013.01); *G06F 3/04842* (2013.01);
(Continued)

(58) Field of Classification Search
CPC .................................................. G06F 3/04842
(Continued)

(56) References Cited

U.S. PATENT DOCUMENTS 7,418,090 B2 *  8/2008  Reding ............. H04M 3/42221
                                                       379/202.01
7,996,775 B2 *  8/2011  Cole ....................... H04L 51/04
                                                       715/752

(Continued)

OTHER PUBLICATIONS

Sue Waters, "The complete educator's guide to using skype effectively in the classroom", available at [http://http://www.theedublogger.com/files/2011/04/skype_guide-23Ip0qv.pdf], released on Apr. 2011, 10 pages.*

(Continued)

*Primary Examiner* — Reza Nabi
(74) *Attorney, Agent, or Firm* — Haynes and Boone, LLP

(57) ABSTRACT

A method includes, within a Graphical User Interface (GUI), displaying a contact list and a conversation container to a user, the contact list including a plurality of contact objects, the conversation container being an active object used to represent an ongoing conversation, receiving input from a user through the GUI, the input instructing the client computing system to move a first contact object from the plurality of contact objects over the conversation container and drop the first contact object into the conversation container, in response to dropping the first contact object into the conversation container, instructing a server to open a first communication session between the client system and a first device associated with the one of the contact objects, the first communication session being of a first media type, and engaging in communication through the first communication session with the first device.

20 Claims, 12 Drawing Sheets

(51) Int. Cl.
*H04L 29/06* (2006.01)
*H04L 12/18* (2006.01)
*G06F 3/0486* (2013.01)
*H04M 3/56* (2006.01)

(52) U.S. Cl.
CPC ...... *G06F 3/04847* (2013.01); *H04L 12/1822* (2013.01); *H04L 65/1069* (2013.01); *H04L 65/1089* (2013.01); *H04L 65/1093* (2013.01); *H04L 65/403* (2013.01); *H04M 3/566* (2013.01); *H04M 3/567* (2013.01)

(58) Field of Classification Search
USPC ........................................................ 715/753
See application file for complete search history.

(56) References Cited

U.S. PATENT DOCUMENTS

| | | | | |
|---|---|---|---|---|
| 8,108,781 | B2* | 1/2012 | Laansoo | G06F 16/2477 715/751 |
| 8,467,502 | B2* | 6/2013 | Sureka | H04L 12/1822 379/142.07 |
| 8,681,203 | B1* | 3/2014 | Yin | H04N 7/15 348/14.08 |
| 8,774,168 | B2* | 7/2014 | Petrack | H04M 7/1205 370/352 |
| 9,043,410 | B2* | 5/2015 | MacDonald | H04L 51/16 709/206 |
| 2006/0104306 | A1* | 5/2006 | Adamczyk | H04L 67/24 370/466 |
| 2006/0171378 | A1* | 8/2006 | Harris | H04L 29/06027 370/352 |
| 2010/0064014 | A1* | 3/2010 | McLaughlin | H04L 67/24 709/206 |
| 2011/0243125 | A1* | 10/2011 | Kaal | H04M 1/2535 370/352 |
| 2011/0286583 | A1* | 11/2011 | Hultkrantz | H04M 3/42204 379/88.01 |
| 2012/0059873 | A1* | 3/2012 | Anikin | H04L 67/2804 709/203 |
| 2012/0059874 | A1* | 3/2012 | Dodd | H04L 67/2804 709/203 |
| 2012/0092439 | A1* | 4/2012 | Mackie | H04N 7/147 348/14.06 |
| 2013/0066974 | A1* | 3/2013 | Yoakum | H04L 65/1069 709/205 |
| 2013/0147903 | A1* | 6/2013 | Weiser | H04M 3/567 348/14.08 |
| 2013/0151623 | A1* | 6/2013 | Weiser | H04N 7/147 709/205 |
| 2014/0003450 | A1* | 1/2014 | Bentley | H04N 7/15 370/468 |
| 2014/0118471 | A1* | 5/2014 | Guo | H04N 7/152 348/14.09 |
| 2015/0009276 | A1* | 1/2015 | Maxwell | H04N 7/15 348/14.07 |
| 2015/0295777 | A1* | 10/2015 | Cholkar | G06F 3/04842 715/753 |
| 2015/0295955 | A1* | 10/2015 | Cholkar | H04L 65/403 709/204 |
| 2015/0295960 | A1* | 10/2015 | Cholkar | H04L 65/1006 709/204 |
| 2015/0326729 | A1* | 11/2015 | Paolini-Subramanya | H04M 1/2535 370/260 |
| 2016/0014061 | A1* | 1/2016 | Cholkar | H04L 51/10 709/206 |
| 2016/0014178 | A1* | 1/2016 | Cholkar | H04N 21/25825 348/14.12 |

OTHER PUBLICATIONS

Apple, "Iphone User Guide", iPhone iOS 4.2, released on Mar. 2011, 274 pages.*
Stephen Cho, "Hangouts Enrich Apps Everywhere With Video Meetings", Google: Official Enterprise Blog, Jun. 3, 2014, http://googleenterprise.blogspot.com/2014/06/hangouts-enrich-apps-everywhere-with.html, accessed on Sep. 12, 2014.
Google Hangouts—A Complete Guide, http://www.youtube.com/watch?v=C3WouWiu7pI, Pub. Jan. 14, 2014, accessed on Sep. 12, 2014.
Avaya Flare Experience Guided Tour, http://www.avaya.com/usa/campaign/avaya-flare-experience-guided-tour/, accessed on Sep. 12, 2014.
Genband Smart Office, https://www.youtube.com/watch?v=J5Ekolbti_U, Pub. Feb. 18, 2013, accessed on Sep. 12, 2014.
MWC13 Genband Smart Office, https://www.youtube.com/watch?v=n26wdugnT7M, Pub. Mar. 25, 2013, accessed on Sep. 12, 2014.
Smart Office Conversation Manager Demo, https://www.youtube.com/watch?v=DAM6a4Tk0lU, Pub Mar. 24, 2014, accessed on Sep. 12, 2014.
U.S. Appl. No. 12/683,026, filed Apr. 10, 2015, entitled: Collaborative Multimedia Conversation Manager.

* cited by examiner

COLLABORATIVE MULTIMEDIA COMMUNICATION

This application is a non-provisional of U.S. Provisional Patent Application No. 61/978,705 filed Apr. 11, 2014 and entitled "Collaborative Multimedia Communication," the disclosure of which is hereby incorporated by reference in its entirety.

BACKGROUND

The present disclosure relates generally to communication management, and more particularly to methods and systems for intuitive multimedia communication.

People often communicate using various types of media. For example, people may engage in voice communication over the phone, whether by a landline, mobile phone, or voice over internet protocol (VOIP) applications. Additionally, users may use email and instant messaging applications. Other methods such as video conferencing and document sharing technologies are available as well.

In general, when one user is communicating with another user using one type of media and desires to use a second type of media, the user has to manually connect or set up a connection with the new media. For example, if a user is on a phone call with another user and desires to share his or her computer desktop with the other user, the user has to manually set up the desktop sharing with the other user. This typically involves sending a link via email to the other user.

Managing multiple applications and media types can often be a daunting task for a user. This can have an adverse effect on productivity. Additionally, this may be a source of frustration for a user. Thus, it is desirable to provide methods and systems that provide a better user experience for various communication applications.

SUMMARY

A method performed by a client computing system in a communications network includes, within a Graphical User Interface (GUI), displaying a contact list and a conversation container to a user, the contact list including a plurality of contact objects, the conversation container being an active object used to represent an ongoing conversation, receiving input from a user through the GUI, the input instructing the client computing system to move a first contact object from the plurality of contact objects over the conversation container and drop the first contact object into the conversation container, in response to dropping the first contact object into the conversation container, instructing a server to open a first communication session between the client system and a first device associated with the one of the contact objects, the first communication session being of a first media type, and engaging in communication through the first communication session with the first device.

A client computing system includes a processor and a memory comprising machine readable instructions that when executed by the processor cause the system to: render a Graphical User Interface (GUI), the GUI being configured to display a conversation container and a plurality of contact objects, the conversation container comprising an active object that represents a conversation, receive a first input from a user to move a first contact object from the plurality of contact objects over the conversation container, receive a second input from the user to drop the contact object into the conversation container, in response to the second input, instruct a server to open a first communication session between the client system and a first device associated with the one of the contact objects, the first communication session being of a first media type, and transmit media data to the first device via the communication session.

A computer program product comprising machine readable instructions stored on a non-transitory computer readable medium, the machine readable instructions comprising code to render a conversation container within a Graphical User Interface (GUI), the conversation container being an active object within the GUI, the active object being used to represent ongoing conversations, provide a contact list within the GUI, the contact list including a plurality of contact objects, receive input from a user to move one of the contact objects from the contact list to the conversation container, and in response to moving the one of the contact objects into the conversation container, instruct a server to open a first communication session between the client system and a first device associated with the one of the contact objects, the first communication session being of a first media type.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a user of conventional systems has to manage multiple communication applications when communicating with different types of media. Managing multiple applications and media types can often be a daunting task for a user. This can have an adverse effect on productivity. Additionally, this may be a source of frustration for a user. Thus, it is desirable to provide methods and systems that provide a better user experience for various communication applications.

According to principles described herein, a conversation manager is used to manage multimedia conversations between different devices associated with different users. For example, the conversation manager may manage communication sessions between two users who are communicating through multiple types of media such as voice, video, instant messaging, screen sharing, etc. Thus, the conversation manager is able to process communications using different types of communication protocols. Specifically, the conversation manager may use VOIP, Real-time Transfer Protocol (RTP), Session Initiation Protocol (SIP), Short Message Service (SMS), Hypertext Transfer Protocol (HTTP), and other communication protocols.

In one example, the conversation manager runs on a server system. The server system is in communication with a number of user devices. The user devices may have a client communication application, which will be referred to as the multimedia communication application. The multimedia communication applications running on various user devices may communicate with each other through the conversation manager or directly over a network such as the Internet. Additionally, as will be described in further detail below, the graphical user interface for the multimedia communication application may provide the user with a number of intuitive tools to make communication and collaboration across multiple communication media simpler.

Figure 1:
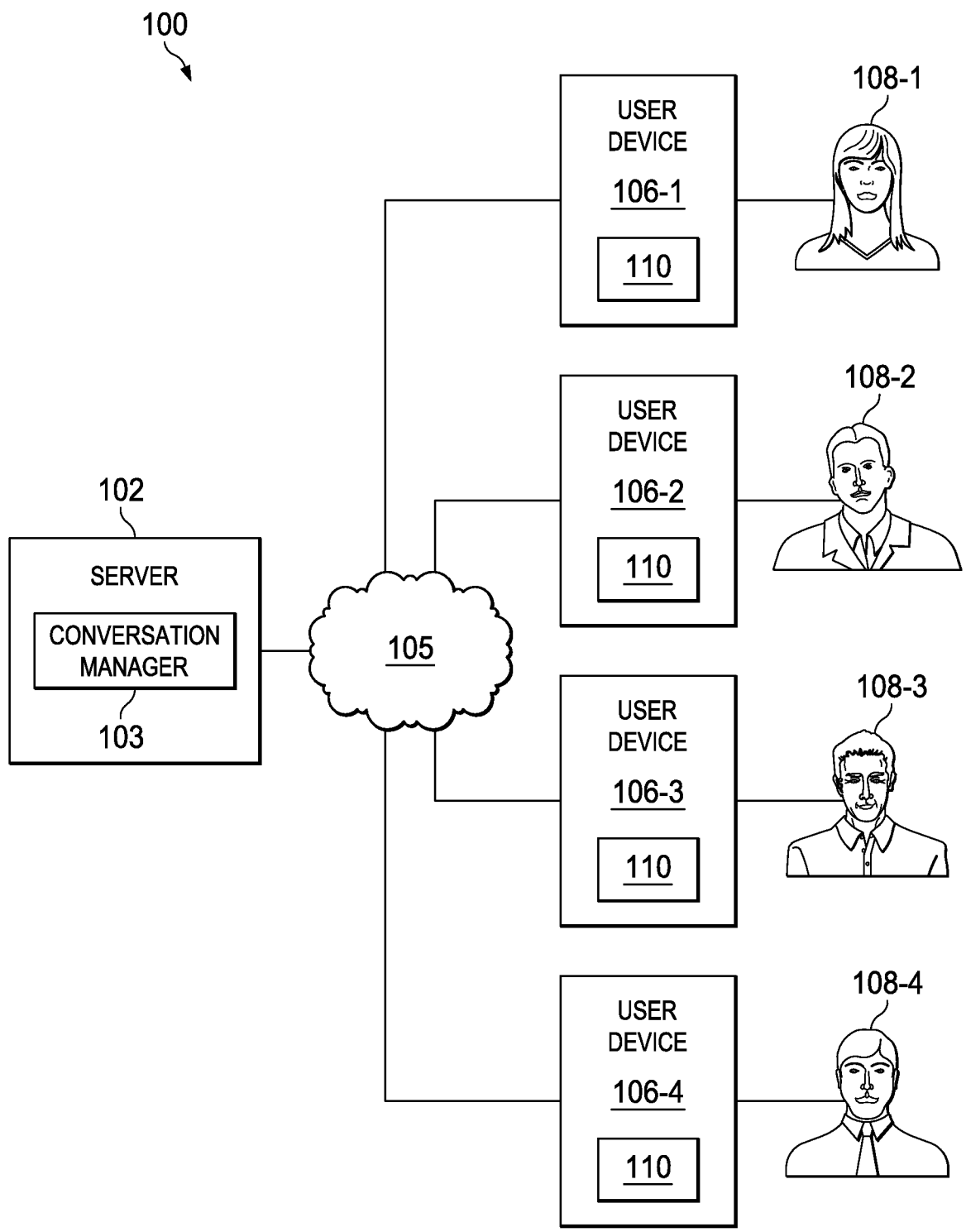
FIG. 1 is a diagram showing an illustrative network environment in which multiple users may communicate using multiple types of media, according to one example of principles described herein.

FIG. 1 is a diagram showing an illustrative network environment 100 in which multiple users 108 communicate using multiple types of media, according to one embodiment. According to the present example, the network environment 100 includes a server 102 and a number of devices 106. Each device 106 is associated with a particular user 108. Each device 106 also has a multimedia communication application 110 installed thereon. The multimedia communication applications 110 communicate over the network 105 with a conversation manager 103 running on the server 102.

The server 102 includes software and hardware that responds to requests over the network 105. Specifically, the server 102 receives requests from various devices 106 over the network 105. The server 102 then responds to those requests accordingly. Such requests may include requests to establish communication from one device 106 to another. In some examples, multiple servers 102 may be used in concert to perform the functions described herein.

The server 102 includes a communication application that will be referred to as the conversation manager 103. In this example, a conversation includes a communication involving one or more users and one or more types of media. Thus, the conversation manager 103 manages communication sessions involving one or more types of media and between one or more end user devices.

The network 105 may include various types of networks involving multiple types of physical media and transport protocols. For example, the network 105 may include a Local Area Network (LAN) using Ethernet, wireless, and fiber optic connections. The network 105 may also include the Internet. The network 105 may use various transmission protocols such as RTP, SIP, and HTTP to transmit data in the form of packets between user devices 106. The network 105 may also include mobile data networks such as Long Term Evolution (LTE) networks. The scope of embodiments is not limited to ant particular network technology for use as, or in, network 105.

The user devices 106 may include a variety of different devices such as desktop computers, laptop computers, tablet computing devices, mobile smart phones and others. Different devices 106 may have different media capabilities. For example, desktop computers, laptop computers, and some tablet computing devices may have the capability of sharing the desktop with another device. But, smart phones may not have such capability.

Each device 106 has a multimedia communication application 110 installed thereon. The multimedia communication application 110 provides users 108 of their respective devices 106 with the tools to communicate with each other using various types of media. Thus, the multimedia communication application 110 is designed for use with various types of protocols for different types of media. As described above, such protocols may include, but are not limited to, RTP, SIP, HTTP, and SMS.

Each device 106 may be associated with a specific user 108. For example, the first device 106-1 is associated with the first user 108-1, the second device 106-2 is associated with the second user 108-2, the third device 106-3 is associated with the third user 108-3, and the fourth device 106-4 is associated with the fourth user 108-4. In one example, each user is associated with a unique identification string such as a SIP username. Thus, when a user of one device wishes to contact another user, he or she can use that user's unique identification string to make such contact. The conversation manager 103 can associate a user's unique identification string with a protocol address associated with that user's device. For example, the conversation manager 103 may associate a user's unique identification number with a specific Media Access Control (MAC) address or an Internet Protocol (IP) address.

In some examples, a user 108 has an account registered with the conversation manager 103. The user 108 may access his or her account through any device 106 having the multimedia communication application 110 installed thereon. When a user logs in through the multimedia communication application 110 of a specific device 106, the conversation manager 103 can register that device 106 with the unique identification number for that user. Thus, when anyone attempts to start a multimedia conversation with that user, the packet stream will be directed to the proper device. Furthermore, although not shown herein, a single user may be associated with, or logged-in at, more than one device at a time.

Figure 2:
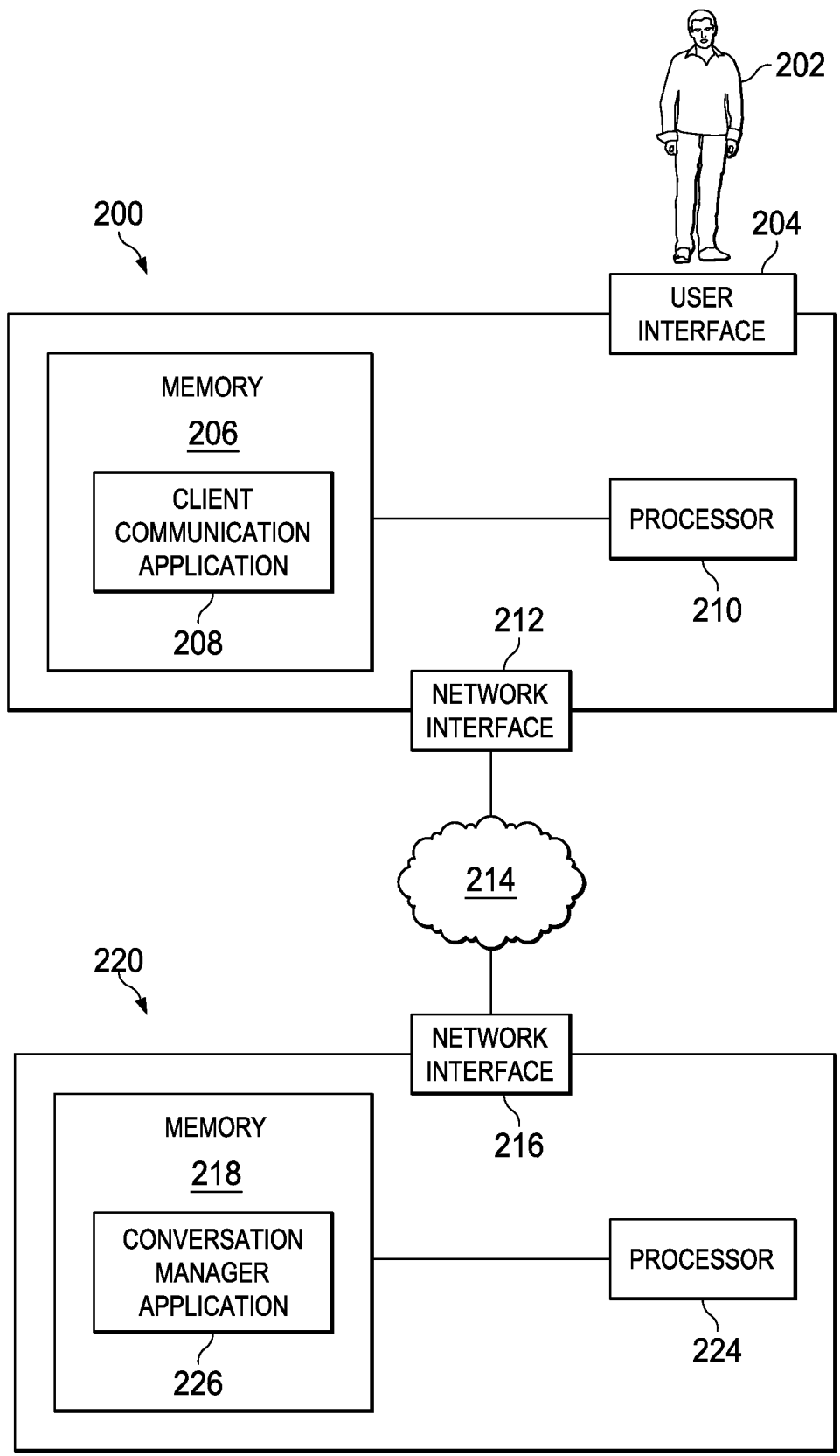
FIG. 2 is a diagram showing an illustrative client/server system, according to one example of principles described herein.

FIG. 2 is a diagram showing an illustrative client/server system. According to the present example, the client system 200 may include a user device such as a desktop computer, laptop computer, smartphone device, or tablet device. The server system 220 can also include any appropriate hardware such as a general purpose computer or other device. An example server includes a multi-processor general purpose computer running an operating system such as Linux. The server system 220 may facilitate communication between various client devices operated by different users having the multimedia communication application 208 installed thereon. The server system 220 runs the conversation manager application 226 that serves requests from the client communication application 208 running on client devices 200.

According to certain illustrative examples, the client system 200 includes a memory 206 which may include software such as the client communication application 208. The client system 200 also includes a processor 210, a network interface 212, and a user interface 204.

The memory 206 may be one of several different types of memory. Some types of memory, such as non-volatile types of memory, typically have large storage volume but relatively slow performance. Volatile memory, such as those used for Random Access Memory (RAM), are optimized for speed and are often referred to as "working memory." The server memory 218 may also include various types of memory such as volatile or non-volatile memory. In some embodiments, the software is stored as computer-readable code in memory 206, 218 and executed by processors 210 and 224 respectively.

The client system 200 also includes a processor 210 for executing software and using or updating data stored in memory 206. The software may include an operating system and various other software applications. In addition to the communication application 208, the client device may include other software such as other communication applications, which may interface with the communication application, and other productivity applications such as word processing and web browsing.

The user interface 204 may include a number of input devices such as a mouse, touchpad, or touchscreen that allow the user 202 to interact with a GUI. The user interface 204 may also include a number of different types of output devices such as a monitor or a touchscreen. The user interface allows the user 202 to interact with the client system 200.

The network interface 212 may include hardware and software that allows the client system 200 to communicate with other devices over a network 214. The network interface 212 may be designed to communicate with the network 214 through hardwire media or wireless media as appropriate. Examples of networks for use in system 214 include the Internet, a LAN, a cellular network or any other appropriate network.

According to certain illustrative examples, the server system 220 includes a memory 218 and a processor 224. The memory may have stored thereon the conversation manager application 226. The server system 220 also includes a network interface 216 for communicating with other devices such as the client system 200.

The conversation manager application 226 may be similar to the conversation manager 103 described above. The implementation of the features described above may be distributed between the server side application 226 and the client side application 208 in a variety of ways.

Figure 3:
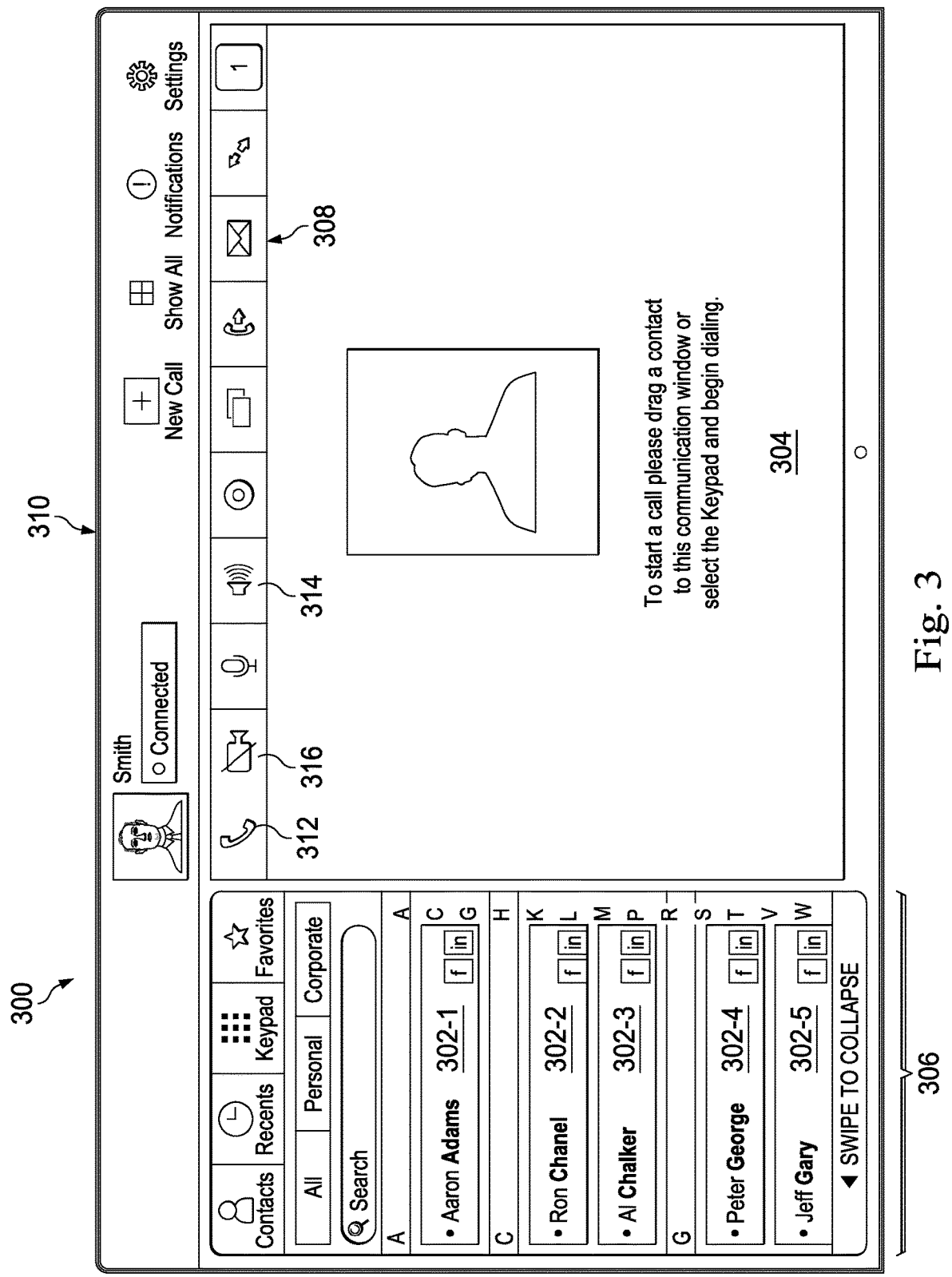
FIG. 3 is a diagram showing an illustrative graphical user interface for a multimedia communication application, according to one example of principles described herein.

FIG. 3 is a diagram showing an illustrative graphical user interface for a multimedia communication application. For purposes of discussion, the user operating the illustrated graphical user interface 300 will be referred to as the operating user. In this example, a client device would display the graphical user interface 300 to the operating user. According to the present example, the user interface 300 includes a contact list 306 displaying a number of contact objects 302. The user interface 300 also includes a conversation container 304 and a toolbar 308.

The contact list 306 displays a list of contact objects 302. Each contact object represents another user having an account with the multimedia communication system. In this example, a first contact is represented by a first contact object 302-1, a second contact is represented by a second contact object 302-2, a third contact is represented by a third contact object 302-3, a fourth contact is represented by a fourth contact object 302-4, and a fifth contact is represented by a fifth contact object 302-5. The contact list 306 may be specific to the operating user. Each specific user may have a different set of contacts with which he or she communicates. In some embodiments, the contact list 306 may be shared among a group of users, such as employees of a company.

The conversation container 304 is a region within the graphical user interface 300 that represents any ongoing communication sessions between other users. In this example, the conversation container 304 is an active object within interface 300, and the operating user interacts with the container 304 to manage conversations as described below. As mentioned above, a conversation includes a communication between one or more users and involving one or more media types. Thus, the appearance of the conversation container 304 will depend on the nature of the present conversation. For example, if only voice communication is ongoing, then the conversation container 304 may display a contact object for the user to which communication has been established. If video conferencing is part of the conversation, then the conversation container 304 may display one or more video feeds. If the conversation includes instant messaging, then instant messaging boxes may be displayed within the conversation container 304.

The conversation toolbar 308 may provide the user with a number of selectable objects related to the conversation represented by the conversation container 304. For example, the user may select an object 312 on the toolbar 308 to initiate or terminate communication with various users. The user may select an object 314 on the toolbar 308 to increase or lower volume. The operating user may further add new media types or new users to the present conversation by selecting an object 316 from the toolbar 308.

Figure 4:
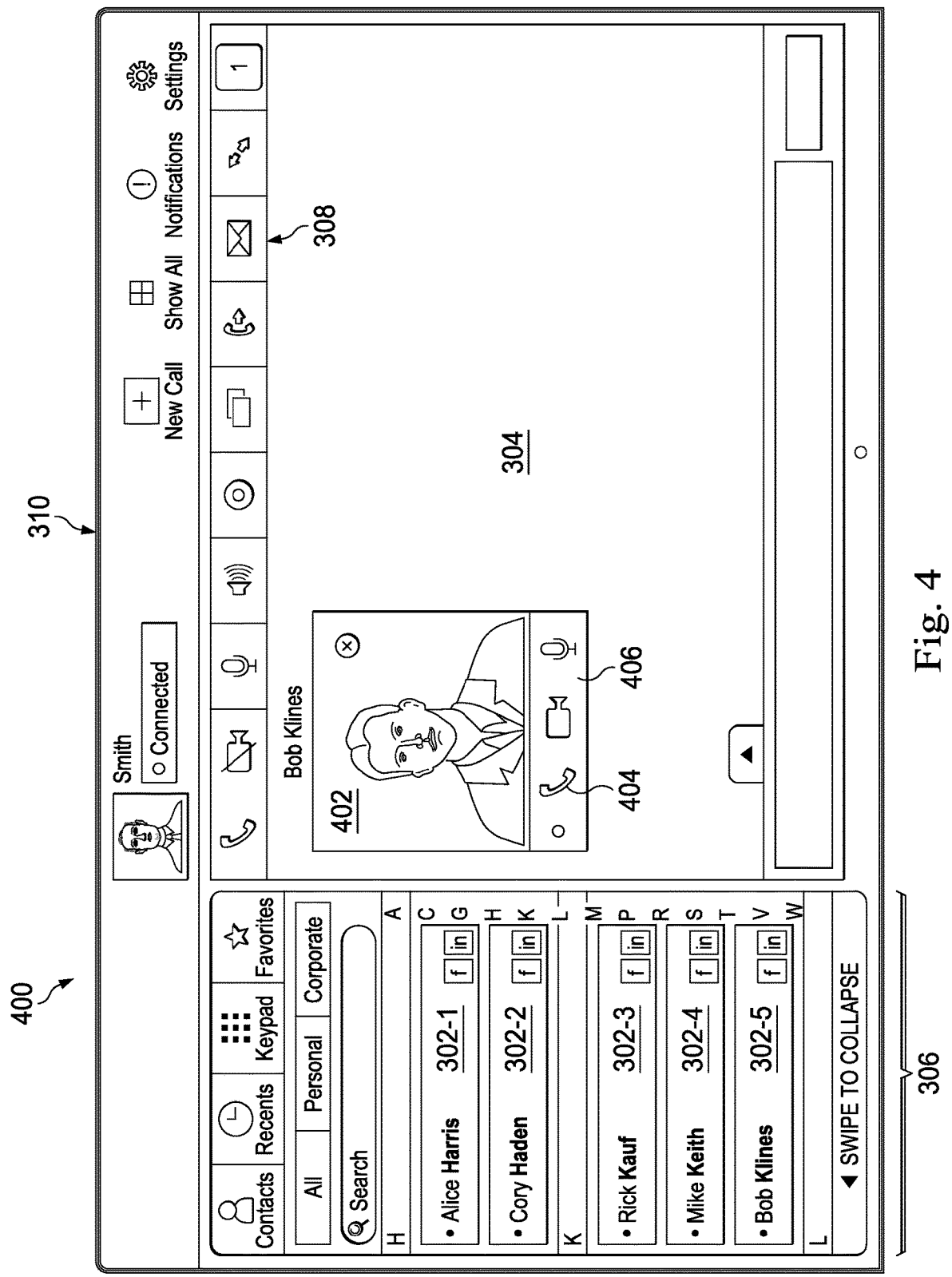
FIG. 4 is a diagram showing an illustrative method for making a conversation using the graphical user interface for the multimedia communication application.

FIG. 4 is a diagram showing an illustrative method for making a conversation using the graphical user interface for the multimedia communication application. According to one example, a user may initiate a conversation by dragging a contact object 302 from the contact list 306 and dropping that contact object 302 in the conversation container 304. For example, the operating user may drag the first contact object 302-1 into the conversation container 304 to establish a communication session with the user associated with the first contact object 302-1.

The methods for dragging and dropping may depend on the user interface. For example, in a touchscreen interface, a user may touchdown on a contact object 302-1 within the contact list 306. While keeping his or her finger or stylus in contact with the screen, the user can drag the contact object 302-1 over to the conversation container 304. While doing so, the selected contact object 302-1 may move with the finger or stylus. When the contact object 302-1 is substantially over the conversation container 304, the user may touch up with his or her finger or stylus. When the touchscreen senses the touch up over the conversation container 304, it is known to the communication application that the user has dropped the contact object 302-1 in the conversation container 304 and thus wishes to establish a communication session with the user associated with the contact object 302-1. In the case of a desktop computer wherein the user interface includes a mouse, the user may move a cursor over the contact object 302-1 and click on that contact object 302-1. While holding the mouse button down, the user may move the cursor over the conversation container 304 and release the mouse button.

In response to the contact object 302-1 being dropped into the conversation container 304, the client communication application 110 sends a request to the conversation manager 103 instructing the conversation manager 103 to establish a communication between the operating user's device and the device associated with the user of the selected contact object 302-1. After receiving the request, the conversation manager 103 opens a communication session between the operating user and the user of the selected contact object 302. In a voice and/or video example, this may be done using SIP. SIP is used to establish a communication session between two devices. After the communication session has been established, communication with various protocols may take place over that session. For example, if the conversation involves audio, then RTP or other protocol may be used to transfer audio streams between two devices.

In some examples, a conversation object 402 within the conversation container 304 represents the conversation between the operating user and the user associated with the contact object 302-1 that was dropped in the conversation container 304. The conversation itself may include one or more communication sessions for each type of media. In some examples, the conversation object 402 may display an image of the appropriate user. This image may uploaded by the user associated with the contact in association with his or her account. The conversation object 402 may also display various icons 404, 406 that indicate the status and nature of the communication session with the user associated with the conversation object 402. For example, if it is a voice only communication session, an icon 404 may indicate as such. An icon 406 may also indicate whether the voice communication session is muted. Other icons that show various characteristics of either the contact or the communication session are contemplated.

Figure 5:
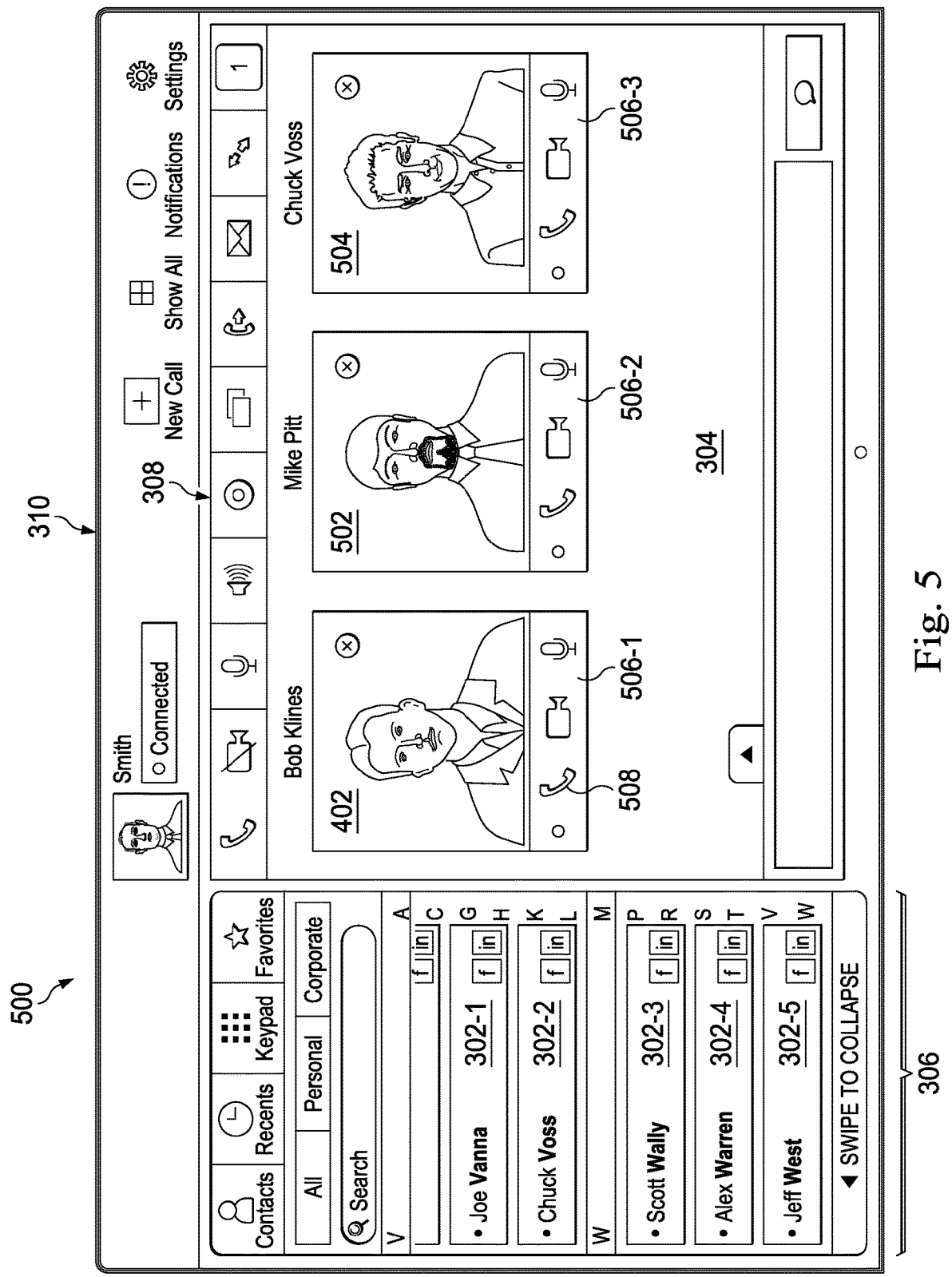
FIG. 5 is a diagram showing an illustrative method for adding additional users to a conversation with the graphical user interface of the multimedia communication application, according to one example of principles described herein.

FIG. 5 is a diagram showing an illustrative method for adding additional users to a conversation with the graphical user interface of the multimedia communication application. According to the present example, the graphical user interface 500 may allow the operating user to add additional contacts to an ongoing communication session. Adding additional users to a communication session will be referred to as horizontal escalation.

Horizontal escalation may be done in a manner that is similar to that of starting a communication session with a single contact. Specifically, to add a third person to the conversation, the operating user may drag a second contact object 302-2 from the contact list 306 and drop that contact object 302-2 into the conversation container 304. When the multimedia communication application 110 determines that the user has dropped the second contact object 302-2 into the conversation container 304 during an ongoing communication session, the application 110 will instruct the conversation manager 103 to establish a multiparty conversation session between the operating user, the first contact, and the second contact. Upon receiving the instruction from the client device, the conversation manager 103 will act accordingly.

Horizontal escalation may involve adding even more users. For example, the operating user may add a third contact to the conversation. Again, this may be done by dragging a third contact object 302-3 and dropping that contact object 302-3 in the conversation container 304. Upon detecting that the third contact object 302-3 has been dropped into the conversation container 304, the client communication application 110 will instruct the conversation manager 103 to establish a connection with the device of the user associated with the third contact object 302-3.

As each new contact joins the conversation, the conversation container 304 may display a new conversation object for each new contact. For example, the second contact may be represented by a second conversation object 502. The third contact may be represented by a third conversation object 504. The operating user may interact with each conversation object 402, 502, 504 separately. For example, the operating user may mute the second contact but not mute the first or third contact. This may be done by pressing a mute icon 506-2 on the second conversation object 502 while leaving the mute icons 506-1, 506-3 of the other conversation objects 402, 504 alone.

When there are more than two people in a communication session, one user may remove one of those people from the conversation and continue the conversation with the remaining people. This will be referred to as horizontal de-escalation. For example, the operating user may press an end conversation icon associated with the conversation object for the person to leave the conversation. For example, if the operating user wishes to end the conversation with the first contact, the user may push an end conversation icon 508 on the first contact's conversation object 402. In some examples, the user may remove a contact from the conversation by dragging the conversation object associated with a user outside the conversation container 304. For example, the operating user may touch down on the conversation object 402 and drag the conversation object 402 outside the conversation container 304. Once outside the conversation container 304, the user can touch up. The multimedia communication application 110 may recognize this action and instruct the conversation manager 103 to remove the first contact from the present conversation accordingly. The conversation manager then tears down specific media sessions associated with the removed user.

Figure 6:
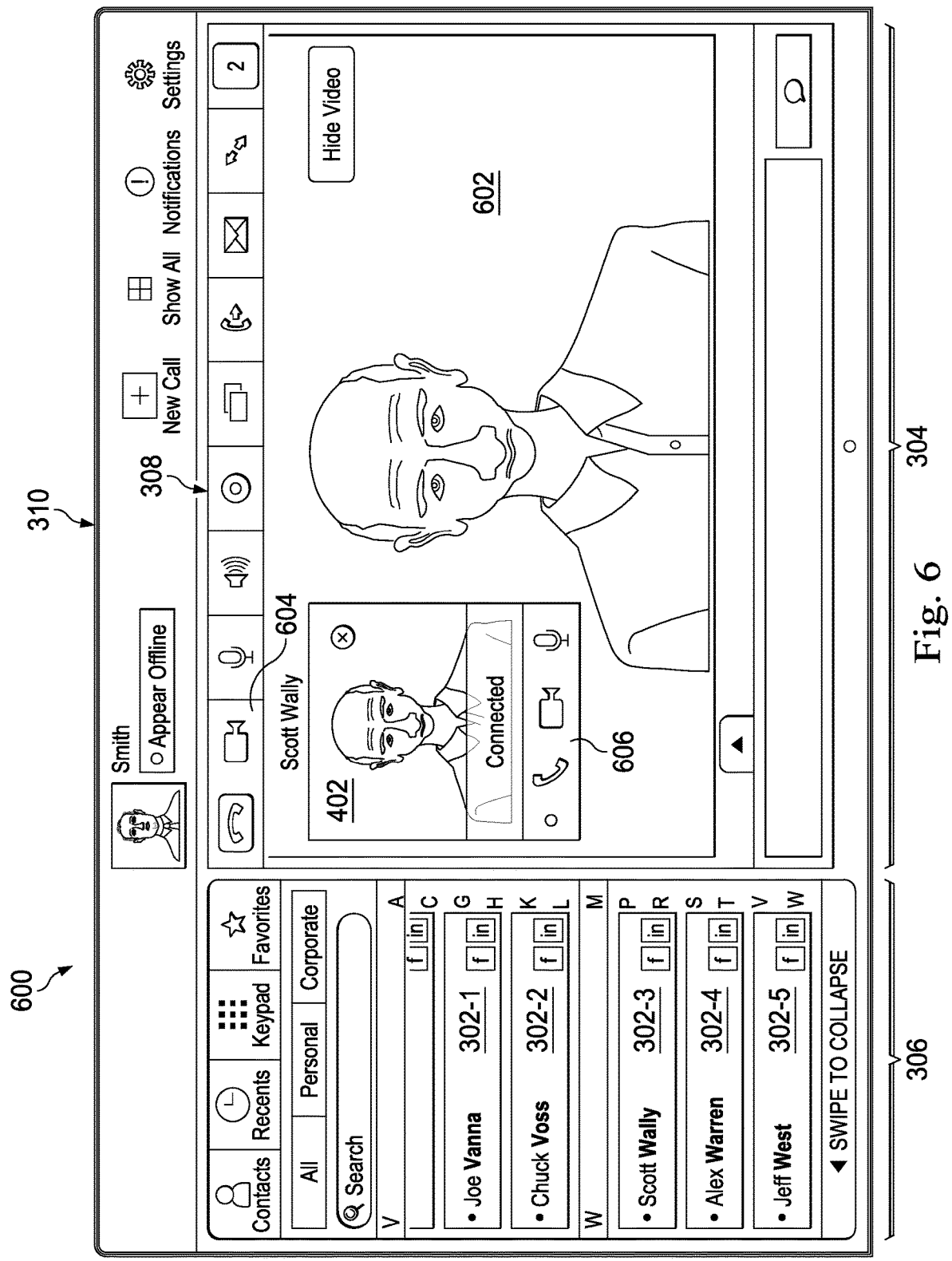
FIG. 6 is a diagram showing an illustrative method for adding an additional media type to a communication session with the graphical user interface of the multimedia communication application, according to one example of principles described herein.

FIG. 6 is a diagram showing an illustrative method for adding an additional media type, particularly, video conferencing, to a communication session with the graphical user interface of the multimedia communication application. According to the present example, during an ongoing communication session, a user may add new types of multimedia to the conversation between one or more users. For example, during a voice only conversation, a user may add a video stream to the conversation as well. Adding new media types to a conversation will be referred to as vertical escalation.

Vertical escalation may be accomplished through the graphical user interface 600 in a variety of ways. For example, the operating user may select an object 604 on the toolbar 308 to escalate a voice only conversation to a voice and video conversation. In one example, the operating user may interact with the communication object 402 associated with the person with whom the operating user is communicating. The communication object 402 may have a selectable object 606 that when pressed, causes the communication application 110 to escalate the conversation with new types of media.

During an ongoing conversation, when a user indicates through the user interface 600 that he or she wishes to vertically escalate the conversation, the multimedia communication application 110 sends a request to the conversation manager 103. The conversation manager 103 then establishes an additional communication session between the operating user and the contact associated with the request for escalation. For example, if there is one stream of data being used for voice, then a second stream of data may be used for video. The second stream may utilize a different networking protocol than the first stream. In some cases, the conversation manager 103 may modify an existing stream to perform the escalation. For example, some protocols may be used for both audio and video data. Thus, the escalation can be performed without an additional stream of data using a different protocol.

While FIG. 6 illustrates vertical escalation of a conversation involving only one other user, it is understood that multiparty conversations may also be vertically escalated. In some cases, all parties to the conversation may be vertically escalated in the same manner. That is, if the conversation is being escalated from voice-only to voice and video, then all participants may escalate to using video conference. But, it may also be the case that only some of the participants of a multiparty conversation are vertically escalated. This may be because the devices used by some of the participants are not capable of video streaming. Alternatively, some participants may simply choose not to participate in the video aspect of the conversation. In one example, the operating user has the option of selecting the persons involved in the multiparty conversation who are to be escalated. Those users may then receive a request for escalation to video which they may choose to accept or decline.

Figure 7:
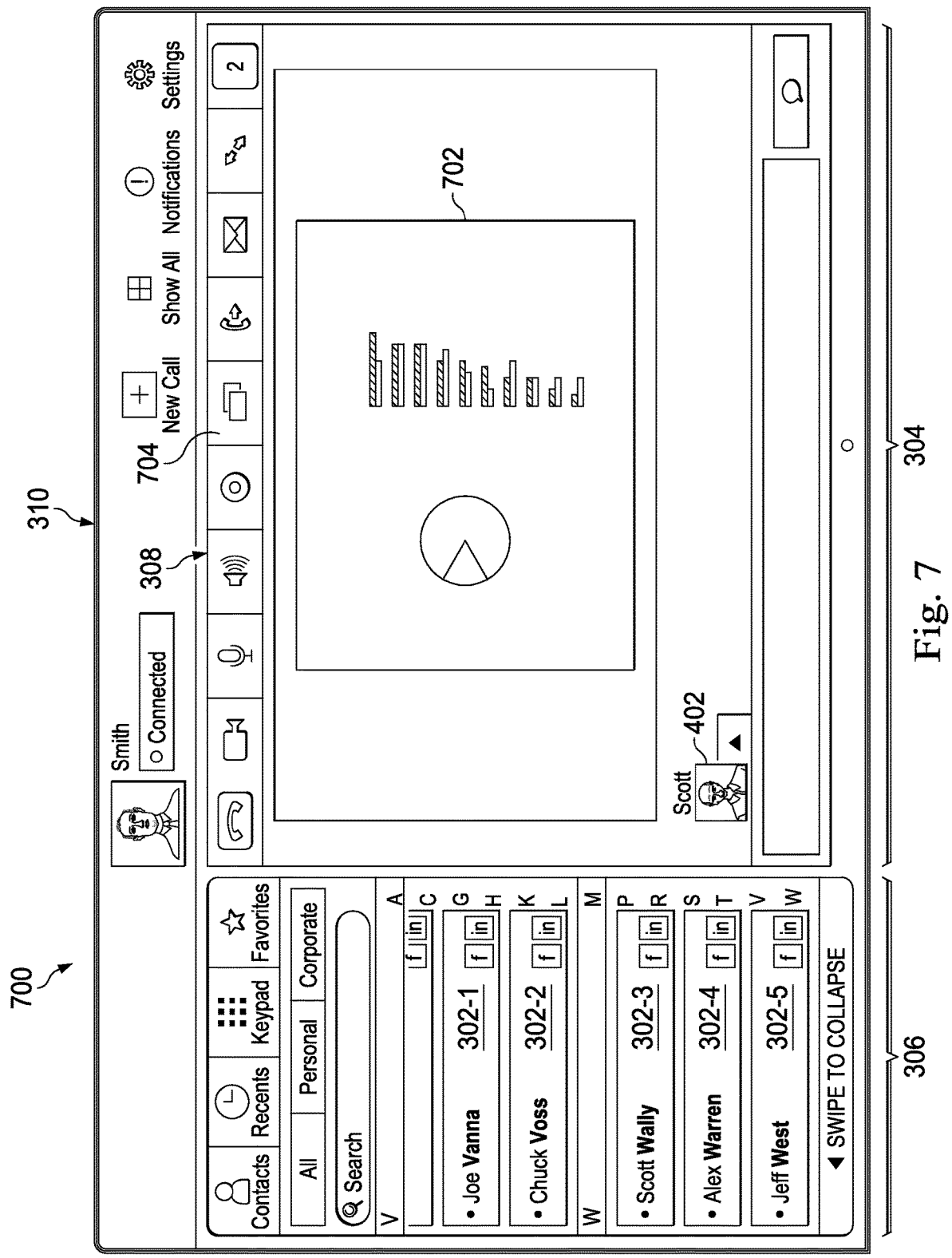
FIG. 7 is a diagram showing an illustrative method for adding an additional media type to a communication session with the graphical user interface of the multimedia communication application, according to one example of principles described herein.

FIG. 7 is a diagram showing an illustrative method for adding a media type, particularly, screen-sharing functionality, to a communication session with the graphical user interface of the multimedia communication application. According to the present example, vertical escalation involves adding screen sharing capability to a voice conversation. Screen sharing allows participants in the conversation to see the screen 702 of one of the users in the conversation. The screen 702 displays various documents such as word processing files or slideshow files. Such files may be the subject of the present conversation.

The operating user may vertically escalate a conversation to include screen sharing in a variety of ways. For example, the operating user may select an object 704 on the toolbar 308. In some examples, the operating user may interact with the communication object 402 associated with another participant in the conversation. For example, the communication object 402 may include controls (not shown) to escalate the conversation to include screen-sharing.

In some examples, the screen-sharing function may share the entire desktop of a particular conversation participant. In some cases, the screen-sharing function may display only a particular file. In some examples, all participants may have the ability to edit the file so that they may all collaborate on a particular document. In some examples, the conversation participants may use various drawing tools to temporarily mark the document for all the other participants to see. Such a tool may be used to reference a particular portion of the document currently being discussed.

When one of the conversation participants uses the graphical user interface 700 to vertically escalate the conversation to include screen-sharing, the multimedia communication application 110 instructs the conversation manager 103 to change or modify the current communication session to include the data streams or new protocols to support the additional type of media. For example, the conversation manager 103 may set up a connection using Remote Frame Buffer (RFB) protocol to provide screen sharing functionality.

In this example, the shared screen 702 takes up most of the space allotted to the conversation container 304. Thus, in this example, any communication objects 402 associated with the conversation are reduced in size and placed below the shared screen 702. While only a single contact is shown as being part of the conversation, an operating user may escalate a multiparty conversation to include screen-sharing functionality. In some examples, not all participants of the multiparty conversation may be escalated to include screen-sharing functionality. This may be because some users are using devices such as mobile smartphones that may not have the capability to use screen-sharing. In some cases, participants may simply choose not to participate in the screen-sharing aspect of the escalated conversation.

Figure 8:
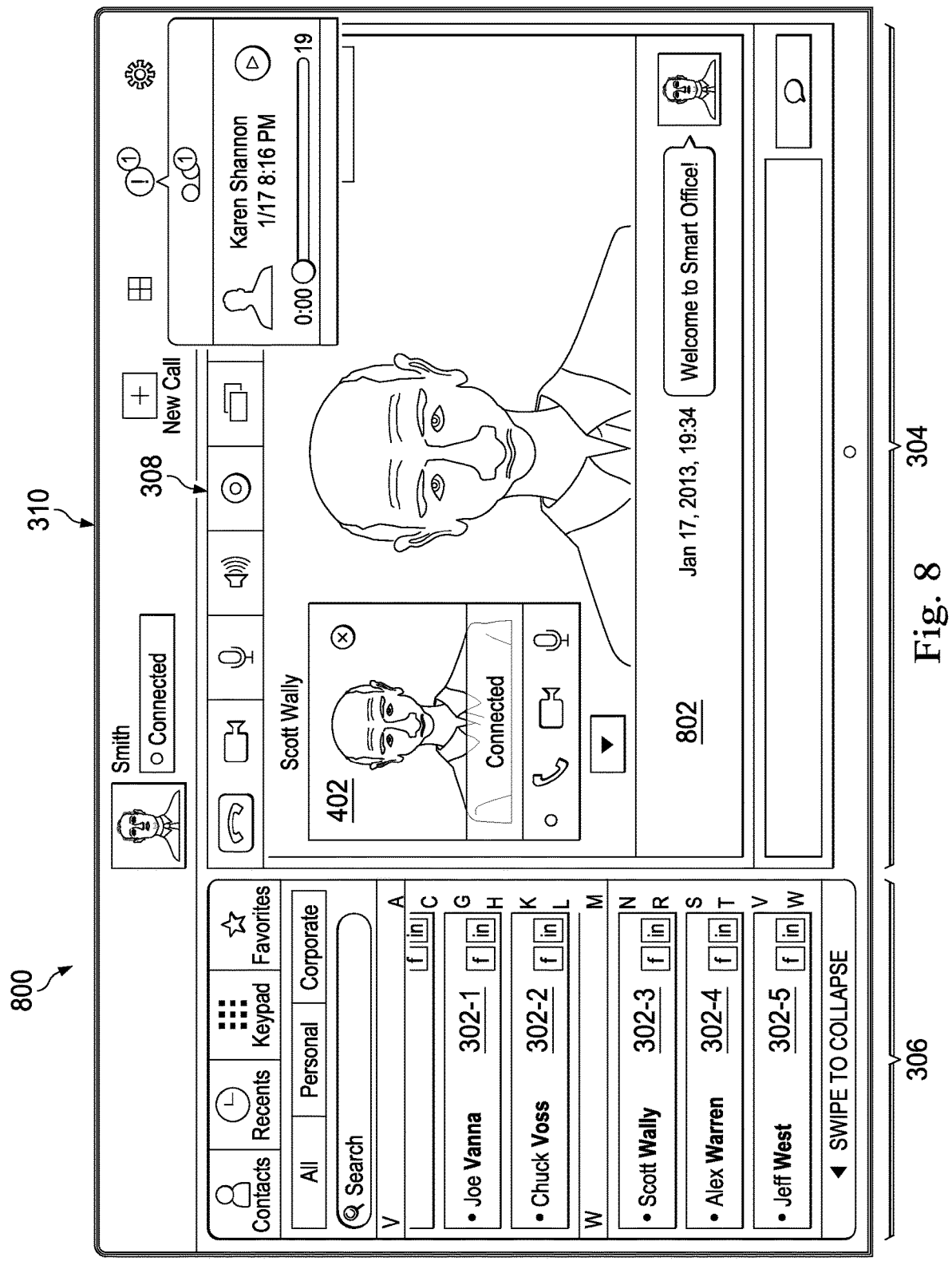
FIG. 8 is a diagram showing an illustrative method for adding an additional media type to a communication session with the graphical user interface of the multimedia communication application, according to one example of principles described herein.

FIG. 8 is a diagram showing an illustrative method for adding an additional media type, particularly, a chat function, to a communication session with the graphical user interface of the multimedia communication application. According to the present example, the operating user chooses to vertically escalate a conversation to include chat functionality. Thus, while conversation participants may be involved in a voice and/or video call, they are able to type messages to each other as well.

According to the present example, the operating user is involved in a conversation that involves both voice and video communication. The user then vertically escalates the conversation to include a chat box 802 as well. This is done by selecting an object (not shown) on the toolbar 308. While only a single contact is shown in the present example, it is understood that an operating user may escalate a multiparty conversation to include chat functionality. In some cases, chats may be shared with the entire group of conversation participants. In other cases, chats may be directed from one specific conversation participant to another participant.

When a conversation participant indicates through the graphical user interface 800 that he or she wishes to escalate the conversation to include chat functionality, the multimedia communication application 110 sends a request to the conversation manager 103. The conversation manager 103 then establishes the appropriate connection to allow for such chat functionality. For example, the chat functionality may use HTTP to transfer messages. Alternatively, the chat functionality may use SMS or some other appropriate protocol.

Figure 9:
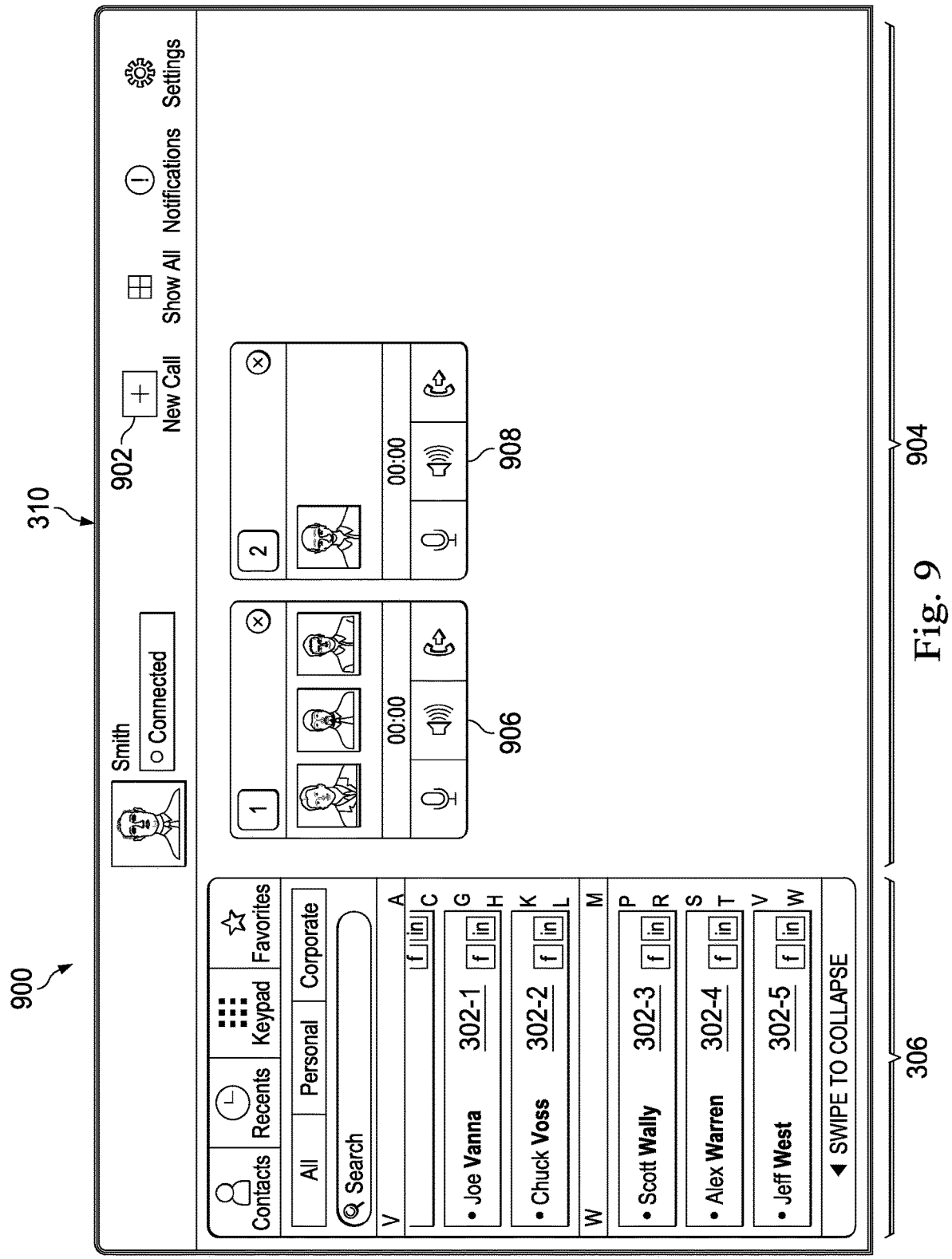
FIG. 9 is a diagram showing an illustrative method for switching conversations with the graphical user interface of the multimedia communication application, according to one example of principles described herein.

FIG. 9 is a diagram showing an illustrative method for switching conversations with the graphical user interface of the multimedia communication application. In some cases, the operating user may establish multiple conversations and switch between those conversations as desired. For example, a user may be involved in a first conversation 906 with contacts 302-1, 302-2, and 302-3. Additionally, the user may be involved in a second conversation 908 between contacts 302-4 and 302-5. The graphical user interface 900 may provide the user with an intuitive method for transitioning between two different conversations.

According to certain illustrative examples, a user may switch between multiple conversations by selecting an active conversation object 902. When the user selects the active conversation object 902, the conversation container 304 is replaced with a conversation viewer 904 that shows a list of any active conversations. The active conversations are represented by conversations objects 906, 908. The user may then select which conversation to switch to by selecting the appropriate conversation object 906. For example, if the user wishes to participate in the first conversation, the user selects the first conversation object 906. If the user wishes to participate in the second conversation, the user selects the second conversation object 908.

Upon detecting that the user wishes to switch conversations, the multimedia communication application 110 instructs the conversation manager 103 to put the first conversation on hold and take the second conversation off of hold. If the first conversation involves voice and video, then the users on the other end of the conversation may hear a muted sound and see a blank screen instead of the video feed.

In some examples, the second conversation, represented by conversation object 908, may be a new conversation that has yet to include any users. For example, when the user switches to the second conversation, the first conversation is put on hold, and the operating user is presented with a blank conversation container 304. The operating user can then add users to the new conversation using the methods described above. Then, if the user wishes to switch back to the first conversation, he or she can again select the active conversation object 902 and select the first conversation. This puts the new conversation on hold and takes the first conversation off of hold.

Figure 10:
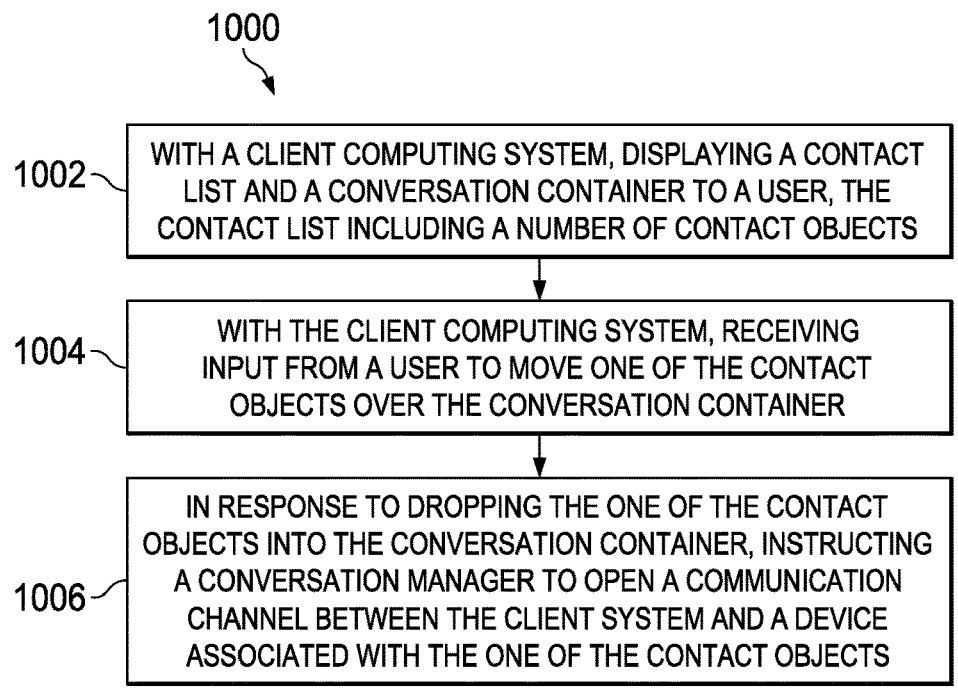
FIG. 10 is a flowchart showing an illustrative method for initiating a communication session using a multimedia communication application, according to one example of principles described herein.

FIG. 10 is a flowchart showing an illustrative method for initiating a communication session using a multimedia communication application. In this example, the method 1000 is performed by a client device running a communication application. The communication application is in communication with a conversation manager at a server. According to the present example, step 1002 includes displaying a contact list and a conversation container to a user, the contact list including a number of contact objects. Step 1004 includes receiving input from a user to move one of the contact objects over the conversation container. Step 1006 includes, in response to dropping the one of the contact objects into the conversation container, instructing a conversation manager to open a communication channel between the client system and a device associated with the one of the contact objects.

Figure 11:
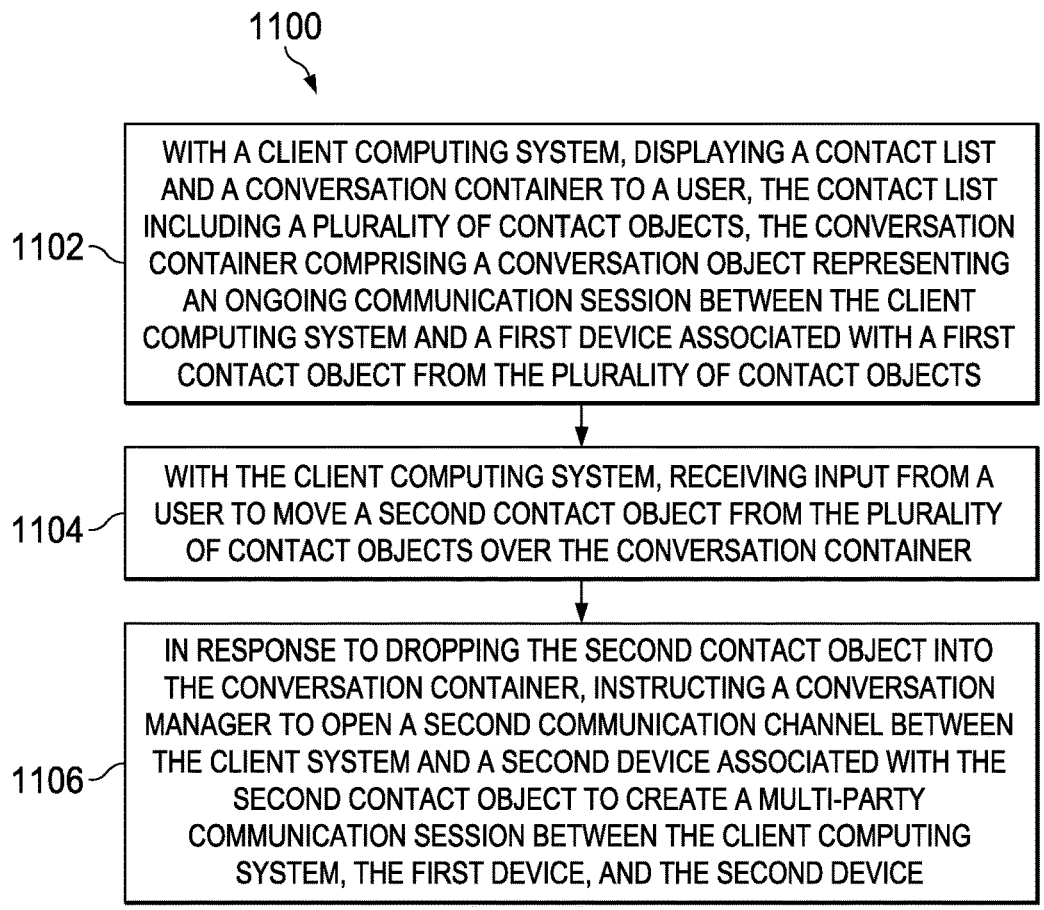
FIG. 11 is a flowchart showing an illustrative method for adding additional users to a conversation within a multimedia communication application, according to one example of principles described herein.

FIG. 11 is a flowchart showing an illustrative method 1100 for adding additional users to a conversation within a multimedia communication application. In this example, the method 1100 is performed by a client device running a communication application. The communication application is in communication with a conversation manager at a server. According to the present example, step 1102 includes displaying a contact list and a conversation container to a user, the contact list including a plurality of contact objects, the conversation container comprising a conversation object representing an ongoing communication session between the client computing system and a first device associated with a first contact object from the plurality of contact objects. Step 1104 includes receiving input from a user to move a second contact object from the plurality of contact objects over the conversation container. Step 1106 includes, in response to dropping the second contact object into the conversation container, instructing a conversation manager to open a second communication channel between the client system and a second device associated with the second contact object to create a multi-party communication session between the client computing system, the first device, and the second device.

Figure 12:
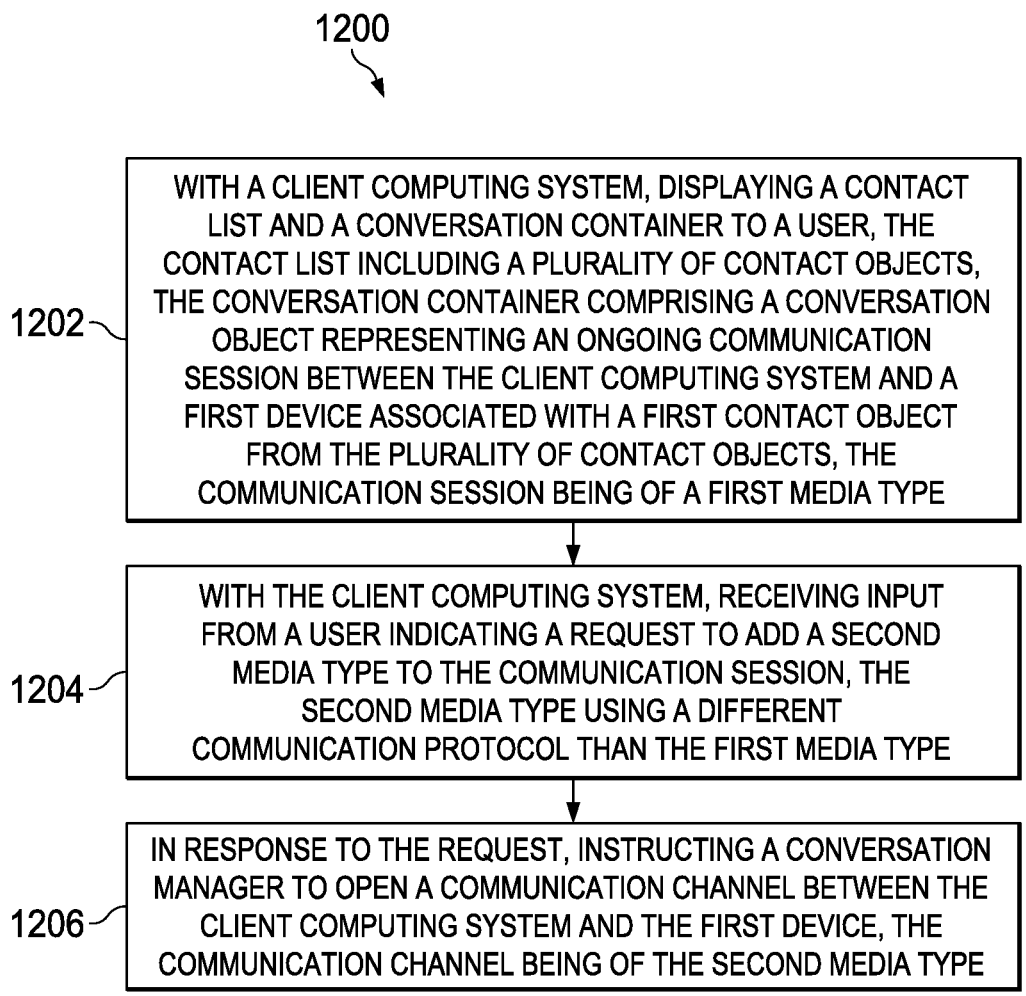
FIG. 12 is a flowchart showing an illustrative method for adding an additional media type to a communication session, according to one example of principles described herein.

FIG. 12 is a flowchart showing an illustrative method for adding an additional media type to a communication session. In this example, the method 1200 is performed by a client device running a communication application. The communication application is in communication with a conversation manager at a server. According to the present example, step 1202 includes displaying a contact list and a conversation container to a user, the contact list including a plurality of contact objects, the conversation container comprising a conversation object representing an ongoing communication session between the client computing system and a first device associated with a first contact object from the plurality of contact objects, the communication session being of a first media type. Step 1204 includes receiving input from a user indicating a request to add a second media type to the communication session, the second media type using a different communication protocol than the first media type. Step 1206 includes, in response to the request, instructing a conversation manager to open a communication channel between the client computing system and the first device, the communication channel being of the second media type.

Figure 13:
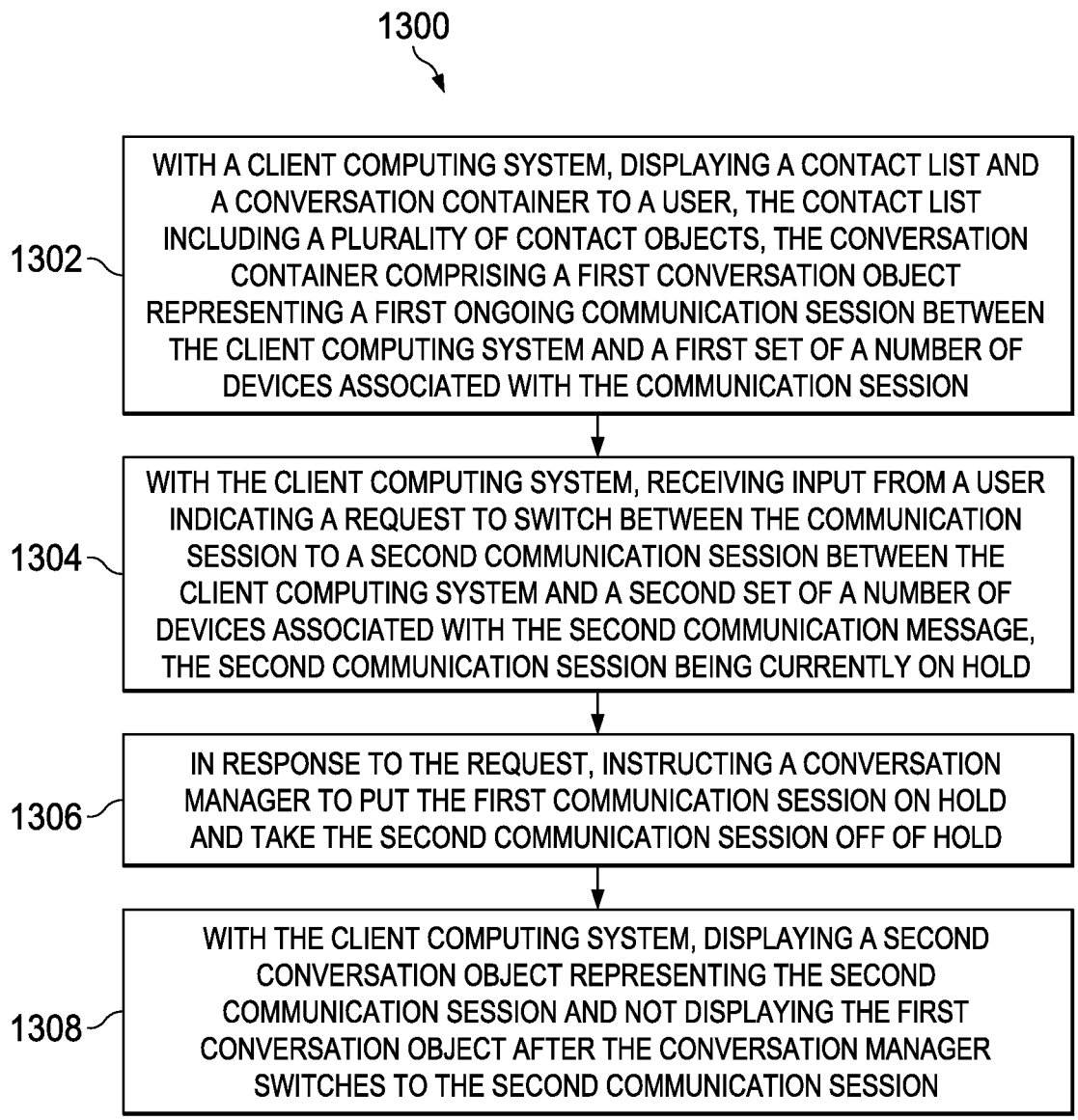
FIG. 13 is a flowchart shoring an illustrative method for switching between communication sessions with a multimedia communication application, according to one example of principles described herein.

FIG. 13 is a flowchart shoring an illustrative method for switching between communication sessions with a multimedia communication application. In this example, the method 1300 is performed by a client device running a communication application. The communication application is in communication with a conversation manager at a server. According to the present example, step 1302 includes displaying a contact list and a conversation container to a user, the contact list including a plurality of contact objects, the conversation container comprising a first conversation object representing a first ongoing communication session between the client computing system and a first set of a number of devices associated with the communication session. Step 1304 includes receiving input from a user indicating a request to switch between the communication session to a second communication session between the client computing system and a second set of a number of devices associated with the second communication message, the second communication session being currently on hold. Step 1306 includes, in response to the request, instructing a conversation manager to put the first communication session on hold and take the second communication session off of hold. Step 1308 includes displaying a second conversation object representing the second communication session and not displaying the first conversation object after the conversation manager switches to the second communication session.

Some examples of processing systems described herein may include non-transitory, tangible, machine readable media that include executable code that when run by one or more processors (e.g., processor 410, 424) may cause the one or more processors to perform the processes of methods 1000, 1100, 1200, and 1300 as described above. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a client computing system in a communications network, the method comprising:
    within a Graphical User Interface (GUI), displaying a contact list and a conversation container to a user, the contact list including a plurality of contact objects, the conversation container being an active object used to represent an ongoing conversation;
    receiving input from a user through the GUI, the input instructing the client computing system to move a first contact object from the plurality of contact objects over the conversation container and drop the first contact object into the conversation container;
    in response to dropping the first contact object into the conversation container, instructing a server to open a first communication session between the client system and a first device associated with the one of the contact objects, the first communication session being of a voice-only media type;
    engaging in communication through the first communication session with the first device; and
    receiving input from a user indicating a request to add a second communication session of a video media type, the video media type using a different communication protocol than the voice-only media type.

2. The method of claim 1, further comprising, receiving input from a user to move a second contact object from the plurality of contact objects over the conversation container and drop the second contact object into the conversation container.

3. The method of claim 2, further comprising, in response to dropping the second contact object into the conversation container, instructing the server to open a second communication session between the client system and a second device associated with the second contact object to create a multi-party communication session between the client computing system, the first device, and the second device.

4. The method of claim 1, wherein the input is received through a user selection of an icon in the conversation container.

5. The method of claim 1, wherein the input is received through a user selection of an object in a toolbar adjacent the conversation container.

6. The method of claim 1, further comprising, in response to the request, instructing the server to open a second communication session between the client computing system and the first device, the second communication session being of the video media type.

7. The method of claim 1, further comprising, within the conversation container, displaying a first active interface object representing the first communication session.

8. The method of claim 7, further comprising:
    in response to user input, instructing the server to put the first communication session on hold; and
    instructing the server to establish a second communication session between the client system and a second device.

9. The method of claim 8, further comprising, displaying a second active interface object representing the second communication session.

10. The method of claim 8, further comprising, in response to user input, instructing the server to put the second communication session on hold and reactivate the first communication session.

11. The method of claim 1, further comprising, in response to the request to add the second communication session, instructing a server to open the second communication system between the client system and the first device associated with the one of the contact objects.

12. A client computing system comprising:
    a processor; and
    a memory comprising machine readable instructions that when executed by the processor cause the system to:
        render a Graphical User Interface (GUI), the GUI being configured to display a conversation container and a plurality of contact objects, the conversation container comprising an active object that represents a conversation;
        receive a first input from a user to move a first contact object from the plurality of contact objects over the conversation container;
        receive a second input from the user to drop the contact object into the conversation container;
        in response to the second input, instruct a server to open a first communication session between the client system and a first device associated with the one of the contact objects, the first communication session being of a voice-only media type;
        in response to a third input, instruct the server to open a second communication session between the client system and the first device, the second communication session being of a video media type and using a different communication protocol than the first communication session; and
        transmit media data to the first device via the first communication session and the second communication session.

13. The system of claim 12, wherein the system is further to:
    receive a fourth input from a user to move a second contact object from the plurality of contact objects over the conversation container and drop the contact object into the conversation container; and in response to dropping the second contact object into the conversation container, instruct the server to open a second communication session between the client system and a second device associated with the second contact object to create a multi-party communication session between the client computing system, the first device, and the second device.

14. The system of claim 12, wherein the system is further to:
    display a first active interface object representing the first communication session within the conversation container;
    in response to a fourth input, instruct the server to put the first communication session on hold; and
    instruct the server to establish a second communication session between the client system and a second device.

15. The system of claim 14, wherein the system is further to display a second active interface object representing the second communication session; and
    in response to a fifth input, instructing the server to put the second communication session on hold and reactivate the first communication session.

16. The system of claim 12, wherein the system is further to:
    after the first contact object is dropped into the conversation container, display a conversation object within the conversation container, the conversation object being associated with a contact associated with the first contact object.

17. The client computing system of claim 12, wherein the system is to communicate with the first device over both the first communication session and the second communication session.

18. A computer program product comprising machine readable instructions stored on a non-transitory computer readable medium, the machine readable instructions comprising code to:
    render a conversation container within a Graphical User Interface (GUI), the conversation container being an active object within the GUI, the active object being used to represent ongoing conversations;
    provide a contact list within the GUI, the contact list including a plurality of contact objects;
    receive input from a user to move one of the contact objects from the contact list to the conversation container;
    in response to moving the one of the contact objects into the conversation container, instruct a server to open a first communication session between the client system and a first device associated with the one of the contact objects, the first communication session being of a voice-only media type; and
    receive input from a user indicating a request to add a second communication session of a video media type, the video media type using a different communication protocol than the voice-only media type.

19. The computer program product of claim 18, further comprising machine readable code to:
    receive input from a user to move a second contact object from the plurality of contact objects over the conversation container; and
    in response to dropping the second contact object into the conversation container, instruct the server to open a second communication session between the client system and a second device associated with the second contact object to create a multi-party communication session between the client computing system, the first device, and the second device.

20. The computer program product of claim 18, further comprising code to cause the client system to communicate with the first device over both the first communication session and the second communication session.

* * * * *